United States Patent [19]
Wong

[11] Patent Number: 5,639,538
[45] Date of Patent: Jun. 17, 1997

[54] SHAPED INTERLAYERS FOR HEAD-UP DISPLAY WINDSHIELDS AND PROCESS FOR PREPARING THE SAME

[75] Inventor: Bert Carl Wong, Marietta, Ohio

[73] Assignee: E. I. Du Pont de Nemours and Company, Wilmington, Del.

[21] Appl. No.: 351,322

[22] PCT Filed: Jun. 25, 1992

[86] PCT No.: PCT/US92/05372
  § 371 Date: Dec. 20, 1994
  § 102(e) Date: Dec. 20, 1994

[87] PCT Pub. No.: WO94/00787
  PCT Pub. Date: Jan. 6, 1994

[51] Int. Cl.$^6$ ............ B32B 3/00; B29C 47/00; G09G 5/00
[52] U.S. Cl. .......... 428/156; 428/172; 428/192; 428/215; 264/177.1; 345/7; 359/630
[58] Field of Search ............ 428/156, 172, 428/192, 161, 212, 215; 156/244.25; 264/177.1; 296/84.1; 345/7; 359/601, 630

[56] References Cited

U.S. PATENT DOCUMENTS

| | | |
|---|---|---|
| 3,868,286 | 2/1975 | Fariss et al. ............ 156/163 |
| 3,922,456 | 11/1975 | Baldridge ............ 428/203 |
| 4,316,868 | 2/1982 | Esposito et al. ............ 264/121 |
| 5,013,134 | 5/1991 | Smith ............ 350/174 |
| 5,087,502 | 2/1992 | Esposito ............ 428/156 |

*Primary Examiner*—Donald Loney
*Attorney, Agent, or Firm*—Oscar A. Towler, III

[57] ABSTRACT

A self-supporting adhesive sheeting material useful in making blanks for laminated windows comprises a continuous web (10) which has a uniform thickness profile (A, B) across at least 20% of its area extending from each edge of the web and a wedge-shaped thickness profile (C, D) which decreases in thickness from the area of uniform thickness to the center of the web, and a process comprising extruding an adhesive composition through an adjustable extrusion die to provide a continuous self-supporting web having a uniform thickness profile across at least 20% of the area of the web extending inwardly from each edge of the web and a wedge-shaped thickness profile decreasing in thickness from the area of uniform thickness to the center of the web, quenching the web, slitting the web along its mid-point, and winding the slit web onto separate rolls.

10 Claims, 1 Drawing Sheet

SHAPED INTERLAYERS FOR HEAD-UP DISPLAY WINDSHIELDS AND PROCESS FOR PREPARING THE SAME

FIELD OF THE INVENTION

This invention relates to shaped interlayers useful in preparing head-up displays for windshields.

BACKGROUND OF THE INVENTION

Head-up instrument displays (HUD) for vehicles have been used to provide virtual images that appear to be located ahead of the vehicle windshield toward the front of the vehicle. These displays provide the advantage of increased safety since the operator does not have to divert attention significantly from viewing the outside to check the instrument status.

Most conventional windshields are made by placing a layer of adhesive, e.g. polyvinyl butyral (PVB) or polyurethane, which has a substantially uniform thickness between two sheets of glass and laminating the sandwiched assembly in an autoclave. In a conventional HUD where the image source is located away from the windshield, the light from the image source reflects off the windshield toward the viewer who sees the image floating in space beyond the windshield. If a conventional windshield is used, the viewer sees two separated images, one from the front surface of the windshield and one from the back surface. These ghost images interfere with acceptable viewing.

Approaches to reduce the ghost image problem include use of an adhesive interlayer disposed within the windshield with the interlayer having a predetermined wedge angle. The wedge angle is selected pursuant to the anticipated installation angle of the windshield, thickness of the glass sheets, and angle of incidence of the projected image so as to substantially superimpose the reflected images generated from a dashboard display device and reflected from the inboard surface and outboard surface of the windshield into a substantially singular image in the eyes of the vehicle operator. Among the approaches are those disclosed in U.S. Pat. 5,013,134 and Published PCT Application WO 91/06031.

The wedge angle for such devices is established by using an adhesive sheet having a wedge-shaped thickness profile extending continuously across the width from edge to edge of the sheet. Such a sheet and a process for preparing the sheet is disclosed in U.S. Pat. 5,087,502.

Web handling problems are encountered in manufacturing and transporting webs having a wedge-shaped thickness profile extending continuously across the width of the sheet. Web walking and telescoping of the wound up web occur damaging the web and rendering it unusable in preparing windshields. These problems also limits "off-line" tinting of the web. While special web handling equipment and procedures can be used, this is expensive and usually requires duplicating existing equipment used in preparing conventional adhesive sheeting. These problems may be alleviated by making only short rolls. However, short rolls necessitate frequent changing of rolls during production and by the customer who processes the sheeting into windshields.

SUMMARY OF THE INVENTION

It would therefore be an advantage to provide adhesive sheeting suitable for HUD windshield manufacture which does not require special web handling equipment and procedures.

This and other advantages are achieved by providing a self-supporting adhesive sheeting having a uniform thickness profile across at least 20% of its width from each edge and a wedge-shaped thickness profile extending from the edge of the area of uniform thickness to the center of the sheeting. This partially wedged sheeting can be wound onto conventional round cores to over 300 meters in length. The web can then be slit into two halves which can be cut and stretched by known processes such as disclosed in U.S. Pat. 5,087,502 and incorporated in windshields. Surprisingly, no special web handling equipment or procedures are required in winding the web into large rolls, and there is virtually no perceptible visual imparity in the windshield along the line where the thickness profile changes.

BRIEF DESCRIPTION OF THE DRAWINGS

In the accompanying drawings.

DETAILED DESCRIPTION OF THE INVENTION

Figure 1:
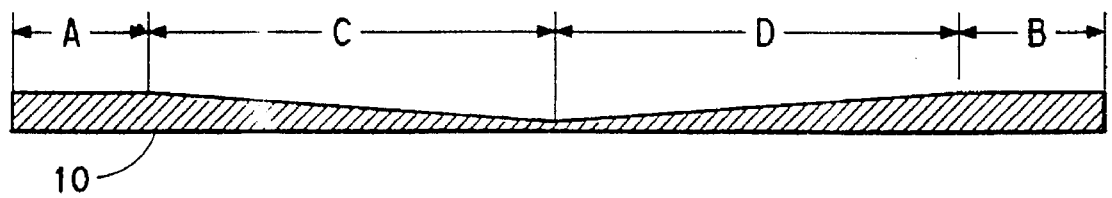
FIG. 1 is a schematic sectional view of a self-supporting adhesive web showing its thickness profile.
Figure 2:
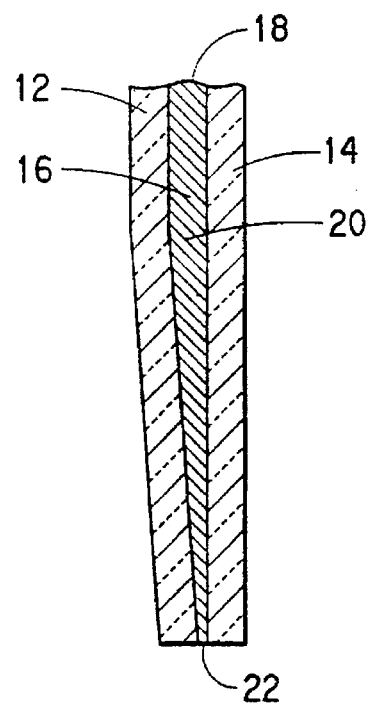
FIG. 2 is a schematic partial sectional view of a transparent laminate showing the sheet thickness profile of one-half of the adhesive web of FIG. 1 which has been incorporated in the laminate.

Referring now to the drawings, there is shown in FIG. 1, a self-supporting adhesive web 10 having a uniform thickness profile across at least 20% of its width as shown by areas A and B and a wedge-shaped thickness profile in areas C and D. As shown in FIG. 2, a laminate comprises sheets of glass 12 and 14 having sandwiched therebetween adhesive interlayer 16. Interlayer 16 has a uniform thickness profile extending from edge 18 to point 20 and a wedge-shaped thickness profile from point 20 to edge 22. The interlayer is made by slitting web 10 of FIG. 1 along its center-line in the transverse direction, cutting the slit web into sheets and incorporating the sheets in a windshield, windscreen, window, viewpoint, or any other transparent laminate through which a surrounding environment may be viewed which may include the windshield of an automobile or other overland vehicle, or the windscreen of an aircraft, etc. The laminate may be composed of glass, plastic such as polycarbonate or acrylic or other transparent material.

The adhesive web of this invention is useful as an interlayer in manufacturing windshields providing a head-up display. The interlayer is disposed within the windshield with the wedge extending transversely thereof and tapering inwardly from the upper toward the lower regions of a head-up display viewing area which includes an image area.

Referring to FIG. 2, the image area will lie in the region of the windshield between point 20 and edge 22. The geometry of interlayer 16 from point 20 to edge 22 is defined as wedge-shaped, that is the distance between the inner surfaces of glass sheets 12 and 14 decreases when measured at various points from point 20 to edge 22. This wedge shape is expressed in terms of the wedge angle created by intersecting planes parallel to the first and second surfaces of interlayer 16. The wedge angle is very small. Generally wedge angles from 0.1 to 1.0 milliradian will be used.

The interlayer wedge angle is selected pursuant to the anticipated installation angle of the windshield, thickness of the transparent sheet material, and angle of incidence of the projected image so as to substantially superimpose the reflected images generated from a dashboard display device and reflected from the inboard surface and from the outboard surface of the outboard sheet into a substantially singular image in the eyes of the vehicle operator.

The width, thickness of the area of uniform thickness, and the thickness profile of the wedged areas can be controlled using known equipment for extruding plastic material. This can be done by either manually or automatically adjusting the lips of an extrusion die. The areas of uniform thickness may have a thickness from 380 to 2286 micrometers with the wedged areas tapering to provide the desired wedge angle. The wedged area must have a width sufficient to accommodate the image area, but otherwise, the size of the area is not critical provided that the area along each side of the web is at least 20% of the total area of the web.

The preferred material for the interlayer of this invention is plasticized polyvinyl butyral which may be prepared by methods known to those skilled in the art, as is described, for example, in U.S. Pat. 2,720,501 to Van Ness, U.S. Pat. 2,400,957 to Stamatoff, and U.S. Pat. 2,739,957 to Woodworth. Such polyvinyl butyral material is available commercially under the trademark Butacite® for plasticized polyvinyl butyral resin, owned by E. I.du Pont de Nemours and Company. Other useful materials include plasticized polyvinyl chloride, polyesters and polyurethanes.

The plasticized polyvinyl butyral structures of this invention are preferably melt-extruded in a manner such as is described in U.S. Pat. 2,829,399 to Caracciolo et al. The extruded film is next preferably quenched in a water bath and dimensionally stabilized in a manner as described in U.S. Pat. 3,068,525 to Linton et al. The film may be printed with a gradated tinted band in a manner as described in U.S. Pat. 2,957,766 and 3,591,406 to Woodacre and Moynihan, respectively. The film is preferably extruded in widths up to 3.25 meters, slit along the center-line and wound up as two rolls. Each roll is then tinted off-line to effect a gradated band along the longitudinal edge having uniform thickness. No web handling problems are encountered provided at least 20% of the web area has a uniform thickness profile.

The invention is further illustrated by the following examples in which parts and percentages are by weight unless otherwise specified. Units originally recorded in English units have been converted to SI units.

EXAMPLE 1

Plasticized polyvinyl butyral containing 100 parts polyvinyl butyral and 38.5 parts tetraethyleneglycol di heptanoate is melt extruded through an adjustable die into a film. The molten film is quenched in a water bath. The quenched film, now a self-supporting sheeting, is passed through a dryer where excess water is allowed to evaporate and then through a relaxer where "quenched in stresses" are substantially relieved. The sheeting is then chilled to less than 10° C., slit along the mid-point of the web width and then wound up into rolls of more than 366 meters. The die lips at extrusion are adjusted to give the sheeting immediately before slitting a cross-sectional thickness profile which is wedged in the center and flat at both ends. After slitting, two rolls of partially wedged polyvinyl butyral film are wound up to lengths in excess of 366 meters. The minimum thickness profile in each roll is 762 micrometers. The wedge angle is 0.36 milliradian. The wedge covers nominally 50% of the width of the film. The average thickness of the flat portion of the sheeting is 965 micrometers. The roll width is 1.12 meters.

Each roll of film is then subjected to double sided printing to effect a gradated shade band on the flat portion. The film is then rewound into rolls about 366 meters in length using conventional web winding equipment.

EXAMPLE 2

Example 1 is repeated except that the die lips are adjusted to give a minimum profile thickness of 813 micrometers and a wedge angle over nominally 70% of the width of the film of 0.52 milliradian. After slitting and printing, the film is then rewound into rolls about 366 meters in length using conventional web winding equipment.

What is claimed is:

1. A continuous web of self-supporting adhesive sheet material for making a transparent adhesive interlayer (16) for laminated windows comprising a continuous web (10) of said sheet characterized by further having a uniform thickness profile across at least 20% of the area of the web extending inwardly from each edge of the web (A, B) and a wedge-shaped thickness profile decreasing in thickness from the area of uniform thickness to the center of the web.

2. The continuous web of self-supporting adhesive sheet material of claim 1 wherein said material is polyvinyl butyral.

3. The continuous web of self-supporting adhesive sheet material of claim 2 wherein said wedge-shaped thickness profile (C, D) has a wedge angle from 0.1 to 1.0 milliradians.

4. The continuous web of self-supporting adhesive sheet material of claim 2 wherein said uniform thickness (A, B) is from 380 to 2286 micrometers, said sheeting having a gradated shade band in the area of uniform thickness.

5. A vehicle windshield for a head-up display system comprising outboard (12) and inboard (14) sheets of glass having a transparent adhesive interlayer (16) sandwiched therebetween, characterized by further having a uniform thickness profile (18, 20) across at least 20% of the area beginning at a top edge of said interlayer and extending to an image area for said display, and having a predetermined wedge-shaped thickness profile (20, 22) extending through the image area to the bottom edge of said interlayer.

6. The windshield of claim 5 wherein said interlayer (16) is polyvinyl butyral.

7. The windshield of claim 6 wherein said wedge-shaped thickness profile (22, 22) has a wedge angle from 0.1 to 1.0 milliradians.

8. A process for preparing transparent adhesive interlayers (16), the process comprising the steps of:
   (a) extruding a plasticized polyvinyl butyral composition through an adjustable extrusion die to provide a web of adhesive sheeting material (10);
   (b) quenching the web (10); characterized by further comprising the steps of:
   (c) slitting said web (10) along its mid-point; and
   (d) winding said slit web onto separate rolls, and wherein said die provides a continuous web of self-supporting material having a uniform thickness profile across at least 20% of the area of the web extending inwardly from each edge of the web and a wedge-shaped thickness profile decreasing in thickness from the area of uniform thickness to the center of said web.

9. The process of claim 8 wherein the wedge-shaped thickness profile has a wedge angle from 0.1 to 1.0 milliradian.

10. The process of claim 8 wherein said uniform thickness is from 380 to 2286 micrometers.

* * * * *